US010322539B2

United States Patent
Breard et al.

(10) Patent No.: US 10,322,539 B2
(45) Date of Patent: Jun. 18, 2019

(54) MOLDING UNIT FOR BLOW MOLDING CONTAINERS, EQUIPPED WITH A GUIDING WEAR RING

(71) Applicant: SIDEL PARTICIPATIONS, Octeville-sur-Mer (FR)

(72) Inventors: Mathieu Breard, Octeville-sur-Mer (FR); Yves Bourdel, Octeville-sur-Mer (FR); Marc Leroux, Octeville-sur-Mer (FR); Arnaud Barbey, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 280 days.

(21) Appl. No.: 15/508,136

(22) PCT Filed: Jul. 8, 2015

(86) PCT No.: PCT/EP2015/065595
§ 371 (c)(1),
(2) Date: Mar. 2, 2017

(87) PCT Pub. No.: WO2016/034311
PCT Pub. Date: Mar. 10, 2016

(65) Prior Publication Data
US 2017/0291346 A1   Oct. 12, 2017

(30) Foreign Application Priority Data
Sep. 4, 2014   (EP) .................................... 14306363

(51) Int. Cl.
*B29C 49/48*   (2006.01)
*B29C 49/42*   (2006.01)
(Continued)

(52) U.S. Cl.
CPC .......... *B29C 49/48* (2013.01); *B29C 49/4236* (2013.01); *B29C 49/541* (2013.01);
(Continued)

(58) Field of Classification Search
CPC ................ B29C 49/4236; B29C 49/48; B29C 2049/4892; B29C 49/541; B29C 49/56
See application file for complete search history.

(56) References Cited

U.S. PATENT DOCUMENTS 5,762,981 A * 6/1998 Nitsche ................... B29C 49/48
249/79
7,025,584 B2 * 4/2006 Tsau ..................... B29C 49/4823
249/79
(Continued)

FOREIGN PATENT DOCUMENTS

| DE | 298 12 475 U1 | 11/1999 |
| FR | 2 921 582 A1 | 4/2009 |
| WO | 99/52701 A1 | 10/1999 |

OTHER PUBLICATIONS

International Search Report, dated Sep. 16, 2015, from corresponding PCT application.

*Primary Examiner* — Robert B Davis
(74) *Attorney, Agent, or Firm* — Young & Thompson

(57) ABSTRACT

A molding unit (1) for blow molding a container from a parison, the container including a wall portion and a base, the molding unit (1) including:
  a mold sidewall (2) extending along a main axis (X) and having an inner molding surface (3) defining a counter print of the wall portion of the container, and an opening (8) at a lower end of the inner molding surface (3),
  a cylinder jacket (10) fixed to the mold sidewall (2) and extending axially below the opening (8);
(Continued)

a movable mold base (14) having a cylindrical bracket (17) slidingly received within the cylinder jacket (10) and a body (15) axially protruding from the bracket (17), a wear ring (33) fixed to the mold base (14), the wear ring (33) including a cylindrical guiding bushing (34) interposed between the bracket (17) and the cylinder jacket (10).

20 Claims, 4 Drawing Sheets

(51) Int. Cl.
| | | |
|---|---|---|
| *B29C 49/54* | (2006.01) | |
| *B29C 49/56* | (2006.01) | |
| *B29L 31/00* | (2006.01) | |
| *B29C 49/06* | (2006.01) | |
| *B29C 49/18* | (2006.01) | |
| *B29K 67/00* | (2006.01) | |

(52) U.S. Cl.
CPC .............. *B29C 49/56* (2013.01); *B29C 49/06* (2013.01); *B29C 49/18* (2013.01); *B29C 2049/4294* (2013.01); *B29C 2049/4892* (2013.01); *B29K 2067/003* (2013.01); *B29K 2859/00* (2013.01); *B29K 2877/00* (2013.01); *B29K 2905/02* (2013.01); *B29K 2905/10* (2013.01); *B29K 2905/12* (2013.01); *B29L 2031/7158* (2013.01)

(56) References Cited

U.S. PATENT DOCUMENTS 8,741,205 B2 * 6/2014 Geltinger ................ B29C 49/48
264/523

2010/0301523 A1 12/2010 Gillet et al.

* cited by examiner

MOLDING UNIT FOR BLOW MOLDING CONTAINERS, EQUIPPED WITH A GUIDING WEAR RING

FIELD OF THE INVENTION

The invention generally relates to the manufacturing of containers, such as bottles, which are produced by blow molding or stretch-blow molding from parisons of plastic (mostly thermoplastic, e.g. PET) material.

BACKGROUND OF THE INVENTION

A container comprises a wall portion (generally of cylindrical shape), an open neck at an upper end of the wall portion, and a closed bottom at a lower end of the wall portion.

Manufacturing a container by blowing generally comprises inserting a parison (a term designating either a raw injected preform, or an intermediate container obtained by pre-blowing a raw injected preform) into a molding unit having a mold sidewall defining a counter print of the container wall portion and a mold base defining a counter print of the container bottom, said parison having previously been heated at a temperature greater than the glass transition of the material, and injecting within the hot parison a fluid (such as air) under pressure. The blowing may be (and generally is) completed with a stretching of the parison by means of a sliding rod.

As the quantity of material required to manufacture each container continuously decreases over the years for economical and environmental reasons, there is a need for enhancing structural rigidity of the container.

Enhancing structural rigidity of the wall portion is knowingly achieved by means of a series of annular rings the function of which is to minimize the risk of container ovalization (i.e. the container section deforming from a circular shape to an oval shape).

Several techniques are also known to provide structural rigidity of the container bottom. One technique consists of providing the container bottom with stiffening artifacts such as ribs, the function of which is to minimize the risk of collapsing of the bottom under the bending stresses due to the hydrostatic pressure of the content and, possibly, the weight of overlaying containers of a same pallet.

Another technique is to provide an extra stretching of the material of the container bottom to mechanically increase cristallinity (and hence mechanical rigidity) thereof. As disclosed in published PCT application WO 99/52701 (Schmallbach-Lubeca), this is generally achieved by means of a movable mold base slidingly mounted with respect of the mold sidewall, whereby the material of the container is firstly blown beyond the final shape in a retracted position of the mold base, and then embossed to the final shape by the mold base moving to a raised position wherein it completes, together with the mold sidewall, the counter print of the container. The molding unit comprises a cylinder jacket and the mold base has a cylindrical bracket slidingly received within the cylinder jacket.

The mold base is generally moved by means of a linear actuator such as a hydraulic or pneumatic jack, including a cylindrical casing and a rod which is slidingly mounted within the casing and to which the cylinder jacket of the mold base is fixed.

This architecture seams satisfactory but nevertheless has its drawbacks. In particular, a linear actuator of standard quality has a backlash of several tens of degree to several degrees (depending upon the manufacturing precision and wear of the actuator). Moreover, the backlash increases in time with usage. This is why angular precision of base mold guidance generally relies upon the dimensional tolerance between the cylinder bracket of the mold base and the cylinder jacket of the mold sidewall.

In order to enhance precision of base mold guidance, which is required to ensure proper operation of the molding unit and proper shaping of the container bottom, the dimensional tolerance between the cylinder bracket of the mold base and the cylinder jacket of the mold sidewall has to be minimized. However, this leads to an undesired accelerated wear of those components, which hence often need to be replaced.

SUMMARY OF THE INVENTION

It is an object of the invention to provide a molding unit in which wear of mobile components is reduced.

It is another object of the invention to provide a molding unit in which precision of the positioning of the mobile components is increased.

It is therefore provided a molding unit for blow molding a container from a parison, said container comprising a wall portion and a bottom, said molding unit comprising:
  a mold sidewall extending along a main axis and having an inner surface defining a counter print of the wall portion of the container, and an opening at a lower end of the inner molding surface,
  a cylinder jacket fixed to the mold sidewall and extending axially below the opening;
  a mold base having a cylindrical bracket slidingly received within the cylinder jacket and a body axially protruding from the bracket and having an upper surface defining a counter print of the container bottom, said mold base being axially movable with respect of the mold sidewall between a retracted position in which the upper surface is offset with respect of the opening, and a raised position in which the upper surface closes the opening,
  a wear ring fixed to the mold base, said wear ring including a cylindrical guiding bushing interposed between the bracket and the cylinder jacket.

The wear ring serves to guide the mold base during its movement, with respect to the cylinder jacket. It provides precise positioning of the mold base with respect to the cylinder jacket, and concentrates the wear due to the movement. It is therefore no longer necessary to often replace the mold base, nor is it necessary to equip the molding unit with a precise linear actuator to move the mold base, as a standard one is sufficient.

According to various embodiments, taken either separately or in combination:
  the wear ring includes a flange which radially protrudes from the guiding bushing and by which the wear ring is fixed to the bracket;
  the flange is integrally formed with the guiding bushing;
  the wear ring is fixed to the bracket by means of screws;
  the wear ring is made of a self-lubricating material;
  the wear ring is made of an oil-impregnated metal;
  said metal is bronze;
  the cylinder jacket is fixed to the mold sidewall by means of screws;
  the molding unit comprises a pair of half molds each defining half the mold sidewall, wherein the half molds are movable with respect to each other, between an open position in which the half molds are spaced from each other and a closed position in which the half molds are in contact with each other to form together the whole counter print of the container wall portion;

the cylinder jacket is formed of a pair of half jackets each fixed to a respective half mold;

each half jacket has a front edge which, in the closed position of the half molds, protrudes from a parting plane defined between the half molds, towards the other half mold and a diametrically opposite back edge which stands back from the parting plane, and wherein, in the closed position of the half molds, the front edge of each half jacket abuts against the back edge of the other half jacket;

the front edge extends on an angular aperture, measured from the parting plane in the closed position, comprised between 7° and 12°;

the protruding front edge of each half jacket has an inner chamfer;

the inner chamfer forms with a plane perpendicular to the parting plane an angle comprised between 10° and 20°;

The above and other objects and advantages of the invention will become apparent from the detailed description of preferred embodiments, considered in conjunction with the accompanying drawings.

DETAILED DESCRIPTION

Figure 1:
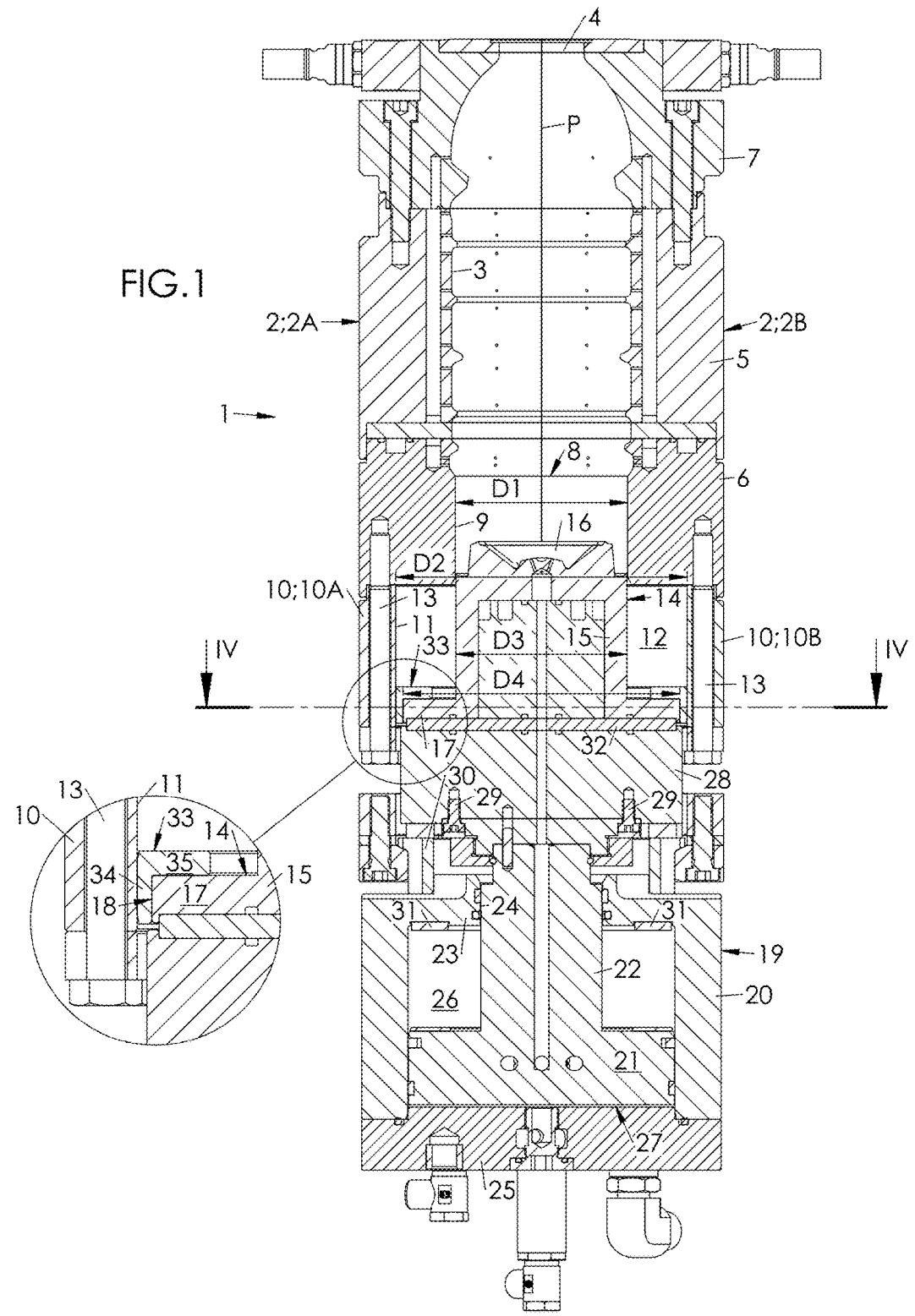
FIG. 1 is a sectional view of a molding unit including a mold sidewall and a mold base movable with respect to the mold sidewall, shown in a retracted position of the mold base. An enlarged detail is shown aside in a circle.

Shown on FIG. 1 is a molding unit 1 for blow molding or stretch-blow molding a container from a parison. The container knowingly has a wall portion, a neck extending from an upper end of the wall portion, and a bottom extending from a lower end of the wall portion. The container wall portion may define a shoulder below the neck.

The molding unit 1 comprises a mold sidewall 2 extending along a main axis X (corresponding to a main axis of the container) and having an inner molding surface 3 defining a counter print of the wall portion of the container.

As depicted on FIG. 1, the mold sidewall 2 has an aperture 4 at an upper end of the inner molding surface 3, through which aperture 4 a hot parison (e.g. a preform) is inserted in the mold sidewall 2 to be blow-molded or stretch-blow molded into the container.

Figure 3:
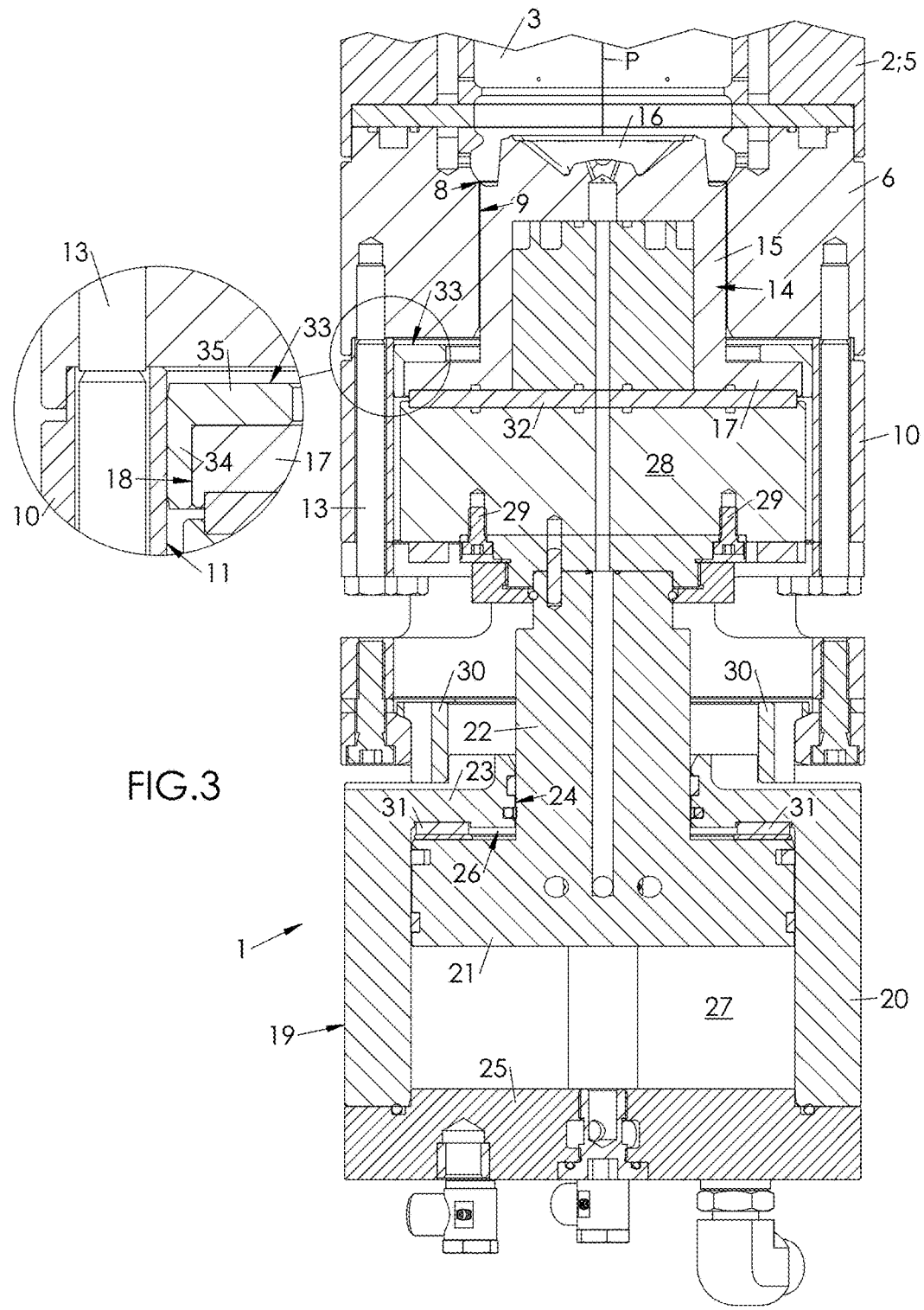
FIG. 3 is a detailed sectional view of the molding unit, shown in a raised position. An enlarged detail is shown aside in a circle.

As illustrated on FIG. 1 and FIG. 3, the mold sidewall 2 may be formed of separate assembled members, including a central member 5 which defines most part of the container wall portion counter print, a lower member 6 which defines a counter print of a lower end of the container wall portion, and possibly an upper member 7 defining a counter print of the container shoulder.

The mold sidewall 2 may be formed of a metallic material, such as steel or aluminum alloy.

The mold sidewall 2 has and an opening 8 at a lower end of the inner molding surface 3. In the depicted embodiment, the opening 8 is defined at an upper end of a bore 9 formed axially within the mold sidewall 2 below the inner molding surface 3. The bore 9 (or the opening 8) has an inner diameter D1. In the depicted embodiment, the bore 9 is formed in the lower member 6 of the mold sidewall 2.

In one preferred embodiment, the molding unit 1 comprises a pair of half molds 2A, 2B each defining half the mold sidewall 2. The half molds 2A, 2B are movable with respect to each other, between an open position in which the half molds 2A, 2B are spaced from each other (in order to allow for ejection of the formed container) and a closed position in which the half molds 2A, 2B are in contact with each other to form together the whole counter print of the container wall portion (and hence to allow for container blowing). The half molds 2A, 2B may be pivotally moveable with respect to each other around a hinge. In that case, in the open position the half molds 2A, 2B are angularly spaced with respect to each other.

The molding unit 1 further comprises a cylinder jacket 10 fixed to the mold sidewall 2 and extending axially below the opening 8. An inner face 11 of the cylinder jacket 10 defines a housing 12 having an inner diameter D2 which is greater than the inner diameter D1 of the bore. The cylinder jacket 10 may be integrally formed with the mold sidewall 2 or, as in the depicted example, formed as a separate component and fixed to the mold sidewall 2, e.g. by means of screws 13.

In case the molding unit 1 comprises a pair of half molds 2A, 2B, the cylinder jacket 10 may also be formed of a pair of half jackets 10A, 10B each fixed to respective half mold 2A, 2B, whereby in the open position of the half molds 2A, 2B the half jackets 10A, 10B are spaced to each other, whereas in the closed position of the half molds 2A, 2B the half jackets 10A, 10B are in contact with each other to form the whole cylinder jacket 10. Instead of being fixed to respective half mold 2A, 2B, the half jackets 10A, 10B may be integrally formed with these respective half molds 2A, 2B. The half molds 2A, 2B have planar contact surfaces, which, in the closed position, together form a parting plane P.

The cylinder jacket 10 is preferably made of a metal material, such as steel or aluminum alloy.

The molding unit 1 further comprises a mold base 14 including a body 15 having an upper surface 16 which defines a counter print of the container bottom. The mold base 14 also includes a cylindrical bracket 17 slidingly received within the cylinder jacket 10 and from which the body 15 axially protrudes upwards. In other words, the bracket 17 radially protrudes like a flange from a lower end of the body 15.

The body 15 is of cylindrical shape and has an outer diameter D3 which is slightly smaller than the diameter D1 of the bore 9. More precisely, a small clearance is provided between the bore 9 and the body 15, in order to allow displacement of the mold base 14 with respect to the mold sidewall 2 while minimizing the risk of the container material flowing between the body 15 and the bore 9 at the end the blowing. In practice, the clearance (equal to half the difference D1-D3) is of about several tenth of a millimeter.

The bracket 17 has an outer cylindrical face 18 a diameter D4 of which is greater than the outer diameter D3 of the body 15 and smaller than the inner diameter D2 of the cylinder jacket 10. The radius difference between the bracket 17 and the cylinder jacket 10 (equal to half the difference D3-D4) defines a gap, the width of which is greater than one millimeter, and preferably of about several millimeters (about 3 mm in the depicted example).

The mold base 14 is axially movable with respect of the mold sidewall 2 between a retracted position (FIG. 1), in which the upper surface 16 is offset downwards with respect of the opening 8, and a raised position (FIG. 3) in which the upper surface 16 closes the opening 8.

As can be seen on FIG. 1 and FIG. 3, the mold base 14 is fixed to a linear actuator 19. In the depicted example, the linear actuator 19 is a fluidic (i.e. hydraulic or pneumatic) jack and includes a cylindrical casing 20, a piston 21 slidingly received within the casing 20 and axially movable with respect thereof, and a rod 22 fixed to—or integrally formed with—the piston 21. The casing 20 has a top wall 23 including a central passage 24 through which the rod 22 protrudes upwardly from the casing 20, and an opposite bottom wall 25. The casing 20 thereby defines an inner volume which is separated by the piston 21 into an upper chamber 26 and a lower chamber 27, the respective volumes of which depend upon the axial position of the piston 21. A pressurized fluid is injected either in the upper chamber 26 to move the piston 21 downwards, or in the lower chamber 27 to move the piston 21 upwards.

The mold base 14 is fixed to the rod 22 in order to be axially displaced as one therewith. In the depicted example, the mold base 14 is fixed onto a support 28 (here of cylindrical shape) which is in turn fixed to the rod 22. Fixation of the support 28 to the rod 22 is preferably achieved by means of screws 29, in order for the support 28 to be dismountable. The mold base 14 is also preferably fixed to the support 28 in a removable manner (e.g. by means of screws) in order to be dismounted and replaced by another mold base 14, which might be similar or different in shape. Such replacement may occur when a different type of container needs to be manufactured.

The travel of the piston 21 (and hence of the mold base 14) is defined by a pair of stops, i.e. a bottom stop 30 and a top stop 31. In the depicted example, the bottom stop 30 is formed by a bearing member fixed to the casing 20 above the top wall 23. Abutment of the support 28 against the bottom stop 30 defines the retracted position of the mold base 14 (FIG. 1). Also in the depicted example, the top stop 31 is formed by a ring fixed to an inner face of the top wall 23 of the casing. Abutment of the piston 21 against the top stop 31 defines the raised position of the mold base 14 (FIG. 3).

As depicted on FIG. 1, a spacer 32 may be interposed between the mold base 14 and the support 28, in order to precisely set position of the mold base 14 with respect of the mold sidewall 2 in the raised position.

While it is desired to precisely guide the mold base 14 with respect to the mold sidewall 2, it is not relied upon the linear actuator 19, of insufficient precision. It is not desired either to let the body 15 of the mold base 14 freely move within the bore 9, for friction of the body 15 against the bore 9 has to be prevented to limit wear and avoid wrong positioning of the upper surface 16 within the opening 8 in the raised position. It is also desired to provide guidance of the mold base 14 as close as possible to the upper surface 16 of the body 15, in order to ensure proper positioning thereof with respect of the mold sidewall 2.

In order to achieve such precise guidance, the molding unit 1 comprises a wear ring 33 fixed to the mold base 14 and including a cylindrical guiding bushing 34 interposed between the bracket 17 and the cylinder jacket 10.

The guiding bushing 34 fills the gap between the outer cylindrical face 18 of the bracket 17 and the inner face 11 of the cylinder jacket 10, only a small clearance (of about one tenth of millimeter or less) being provided between the guiding bushing 34 and the inner face 11 of the cylinder jacket 10. In other words, the radial thickness of the guiding bushing 34 is substantially equal to the difference of radius between the inner face 11 of the cylinder jacket 10 and the outer cylindrical face 18 of the bracket 17.

The wear ring 33 is preferably made of a self lubricating material, such as an oil-impregnated metal (e.g. bronze), whereby sliding of the mold base 14 with respect to the cylinder jacket 10 is made easier, and wear at the interface between the guiding bushing 34 and the cylinder jacket 10 is reduced.

In a preferred embodiment pictured on the drawings (see FIG. 1), the axial extension of the guiding bushing 34 is equal to or greater than the thickness of the bracket 17, whereby the guiding bushing 34 provides precise guidance of the mold base 14. However, it is not necessary to have the guiding bushing 34 extend down to cover the support 28, whereby a gap remains between the support 28 and the cylinder jacket 10.

As the wear ring 33 is mounted on the mold base 14, guidance is provided the closest to the upper surface, to the benefit of the positioning thereof (and hence to the benefit of blowing and container quality).

Figure 2:
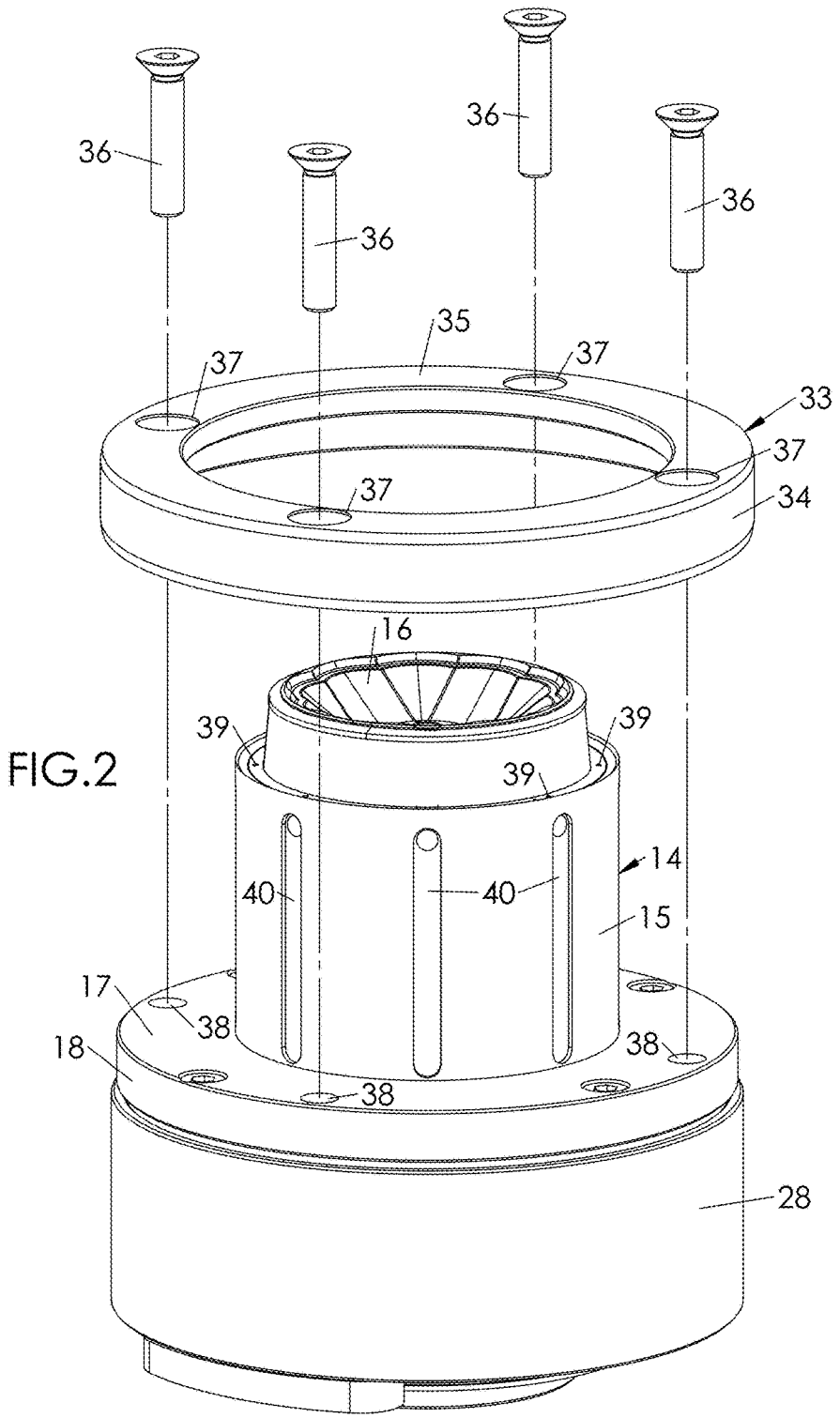
FIG. 2 is an exploded perspective view of the mold base mounted onto a support.

In a preferred embodiment pictured on the drawings, the wear ring 33 includes a flange 35 which radially protrudes from the guiding bushing 34 and by which the wear ring 33 is fixed to the bracket 17. As illustrated in FIG. 2, fixation of the wear ring 33 may be achieved by means of screws 36 passing through apertures 37 axially formed in the flange 35 and coming in helical cooperation with holes 38 axially drilled within the bracket 17.

This fixation provides proper centering of the wear ring 33 with respect to the mold base 14.

The flange 35 is preferably integrally formed with the guiding bushing 34 to form a one-piece wear ring 33 which, in transversal section, has the shape of a corner.

In order to permit evacuation of the fluid imprisoned between the container and the inner molding surface 3 of the mold sidewall 2 toward the housing 12, spout holes 39 may be formed within the upper surface 16 of the body 15, in fluidic communication with a series of slots 40 formed axially in the body 15. The thus evacuated fluid may further be drained out from the housing 12 (and hence from the molding unit 1) by means of a series of axial holes or grooves formed in the guiding bushing 34.

Figure 4:
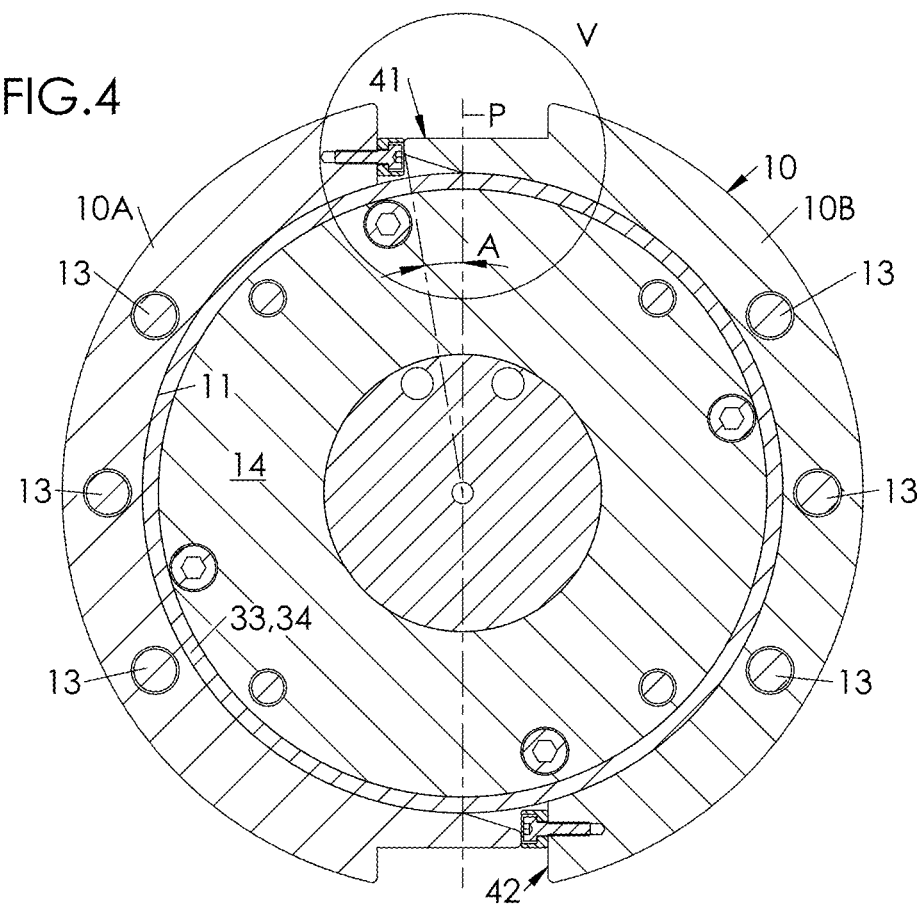
FIG. 4 is a sectional view of the molding unit, along sectional plane IV-IV of FIG. 1.
Figure 5:
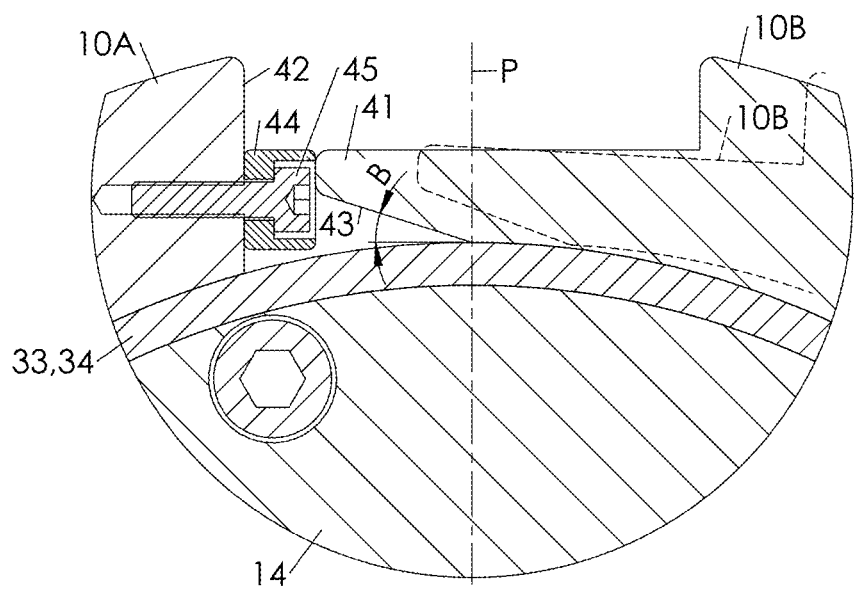
FIG. 5 is an enlarged detailed view of the molding unit, taken in detail circle of FIG. 4.

In a preferred embodiment depicted on FIG. 4 and FIG. 5, each half jacket 10A, 10B has a front edge 41 and a diametrically opposite back edge 42. As depicted on FIG. 4 and FIG. 5, in the closed position the front edge 41 of each half jacket 10B (respectively 10A) abuts against the back edge 42 of the other half jacket 10A (respectively 10B).

In the closed position of the half molds 2A, 2B, the front edge 41 of each half jacket 10B (respectively 10A) protrudes from the parting plane P towards the other half jacket 10A (respectively 10B), whereas, on the contrary, the back edge 42 stands back from the parting plane P.

The protruding front edges 41 serve to better lock the half jackets 10A, 10B in the closed position. Each protruding front edge 41 extends on an angular aperture A (measured from the parting plane P in the closed position) comprised between 7° and 12°, and preferably of about 9.5°.

As depicted on FIG. 5, the protruding front edge 41 of each half jacket 10A, 10B has an inner chamfer 43 which, in the closed position, forms with a plane perpendicular to the parting plane P an angle B. The chamfer 43 serves to ensure smooth closure of the half jacket 10B (respectively 10A). Angle B is preferably comprised between 10° and 20°, and for example of about 17.5°. It can be seen that, due to the presence of the chamfer 43, the half mold 10A (respectively 10B) opens and closes without interfering with the wear ring 33, as illustrated in dotted lines on FIG. 5.

In a preferred embodiment depicted on FIG. 4 and FIG. 5, each half mold 10A (respectively 10B) carries a bearing 44 affixed to the back edge 42 of the half mold 10A (respectively 10B) and to which the front edge 41 of the other half mold 10B (respectively 10A) abuts in the closed position. The bearing 44, which is preferably made of a softer material than the material of the jacket 10, serves as a replaceable wear element which avoids wear of the jacket 10. In case the jacket 10 is made of steel, the bearing 44 is e.g. made of brass or bronze. In case the jacket 10 is made of aluminum, the bearing 44 is preferably made of a plastic material, such as Nylon or POM (polyoxymethylene). The bearing 44 may be made of an elongated strip which is fixed to the back edge 42 of the half mold 10A (respectively 10B) by screws 45.

The invention claimed is:

1. A molding unit (1) for blow molding a container from a parison, said container comprising a wall portion and a bottom, said molding unit (1) comprising:
   a mold sidewall (2) extending along a main axis (X) and having an inner molding surface (3) defining a counter print of the wall portion of the container, and an opening (8) at a lower end of the inner molding surface (3),
   a cylinder jacket (10) fixed to the mold sidewall (2) and extending axially below the opening (8);
   a mold base (14) having a cylindrical bracket (17) slidingly received within the cylinder jacket (10) and a body (15) axially protruding from the bracket (17) and having an upper surface (16) defining a counter print of the container bottom, said mold base (14) being axially movable with respect of the mold sidewall (2) between a retracted position in which the upper surface (16) is offset with respect of the opening (8), and a raised position in which the upper surface (16) closes the opening (8),
   the molding unit (1) further comprising a wear ring (33) fixed to the mold base (14), said wear ring (33) including a cylindrical guiding bushing (34) interposed between the bracket (17) and the cylinder jacket (10).

2. A molding unit (1) according to claim 1, wherein the wear ring (33) includes a flange (35) which radially protrudes from the guiding bushing (34) and by which the wear ring (33) is fixed to the bracket (17).

3. A molding unit (1) according to claim 2, wherein the flange (35) is integrally formed with the guiding bushing (34).

4. A molding unit (1) according to claim 2, wherein the wear ring (33) is fixed to the bracket (17) by means of screws (36).

5. A molding unit (1) according to claim 1, wherein the wear ring (33) is made of a self-lubricating material.

6. A molding unit (1) according to claim 5, wherein the wear ring (33) is made of an oil-impregnated metal.

7. A molding unit (1) according to claim 6, wherein said metal is bronze.

8. A molding unit (1) according to claim 1, wherein the cylinder jacket (10) is fixed to the mold sidewall (2) by means of screws (13).

9. A molding unit (1) according to claim 1, comprising a pair of half molds (2A, 2B) each defining half the mold sidewall (2), wherein the half molds (2A, 2B) are movable with respect to each other, between an open position in which the half molds (2A, 2B) are spaced from each other and a closed position in which the half molds (2A, 2B) are in contact with each other to form together the whole counter print of the container wall portion.

10. A molding unit (1) according to claim 9, wherein the cylinder jacket (10) is formed of a pair of half jackets (10A, 10B) each fixed to a respective half mold (2A, 2B).

11. A molding unit (1) according to claim 10, wherein each half jacket (10B, 10A) has a front edge (41) which, in the closed position of the half molds (2A, 2B), protrudes from a parting plane (P) defined between the half molds (2A, 2B), towards the other half mold (10A, 10B) and a diametrically opposite back edge (42) which stands back from the parting plane (P), and wherein, in the closed position of the half molds (2A, 2B), the front edge (41) of each half jacket (10B, 10A) abuts against the back edge of the other half jacket (10A, 10B).

12. A molding unit (1) according to claim 11, wherein the front edge (41) extends on an angular aperture A, measured from the parting plane P in the closed position, comprised between 7° and 12°.

13. A molding unit (1) according to claim 11, wherein the protruding front edge (41) of each half jacket (10A, 10B) has an inner chamfer (43).

14. A molding unit (1) according to claim 13, wherein the inner chamfer (43) forms with a plane perpendicular to the parting plane (P) an angle (B) comprised between 10° and 20°.

15. A molding unit (1) according to claim 3, wherein the wear ring (33) is fixed to the bracket (17) by means of screws (36).

16. A molding unit (1) according to claim 2, wherein the wear ring (33) is made of a self-lubricating material.

17. A molding unit (1) according to claim 3, wherein the wear ring (33) is made of a self-lubricating material.

18. A molding unit (1) according to claim 4, wherein the wear ring (33) is made of a self-lubricating material.

19. A molding unit (1) according to claim 2, wherein the cylinder jacket (10) is fixed to the mold sidewall (2) by means of screws (13).

20. A molding unit (1) according to claim 3, wherein the cylinder jacket (10) is fixed to the mold sidewall (2) by means of screws (13).

* * * * *